United States Patent
Oyama et al.

(10) Patent No.: US 11,578,168 B2
(45) Date of Patent: Feb. 14, 2023

(54) POLYCARBONATE RESIN AND OPTICAL MEMBER CONTAINING SAME

(71) Applicant: TEIJIN LIMITED, Osaka (JP)

(72) Inventors: Tatsuya Oyama, Osaka (JP); Kazuyoshi Ogasawara, Osaka (JP); Atsushi Umeki, Osaka (JP); Keisuke Sato, Osaka (JP); Manabu Matsui, Osaka (JP)

(73) Assignee: TEIJIN LIMITED, Osaka (JP)

( * ) Notice: Subject to any disclaimer, the term of this patent is extended or adjusted under 35 U.S.C. 154(b) by 160 days.

(21) Appl. No.: 17/043,118

(22) PCT Filed: Mar. 20, 2019

(86) PCT No.: PCT/JP2019/011826
§ 371 (c)(1),
(2) Date: Sep. 29, 2020

(87) PCT Pub. No.: WO2019/188702
PCT Pub. Date: Oct. 3, 2019

(65) Prior Publication Data
US 2021/0040263 A1    Feb. 11, 2021

(30) Foreign Application Priority Data

Mar. 30, 2018 (JP) .............................. JP2018-069389
Oct. 15, 2018 (JP) .............................. JP2018-194193

(51) Int. Cl.
C08G 64/00  (2006.01)
C08G 64/16  (2006.01)
G02B 1/04   (2006.01)

(52) U.S. Cl.
CPC ......... *C08G 64/1608* (2013.01); *G02B 1/041* (2013.01)

(58) Field of Classification Search
CPC ............................ C08G 64/1608; G02B 1/041
USPC ......................................... 528/196, 198, 204
See application file for complete search history.

(56) References Cited

U.S. PATENT DOCUMENTS

| | | |
|---|---|---|
| 4,584,335 A | 4/1986 | Parker |
| 5,532,331 A | 7/1996 | Bales et al. |
| 5,910,562 A | 6/1999 | Miura et al. |
| 2005/0250930 A1 | 11/2005 | Ikeda et al. |
| 2008/0085955 A1 | 4/2008 | Yanagida et al. |
| 2010/0048855 A1 | 2/2010 | Kato et al. |
| 2010/0104777 A1 | 4/2010 | Motoyoshi et al. |
| 2012/0120356 A1 | 5/2012 | Washizu et al. |
| 2012/0123083 A1 | 5/2012 | Nunome et al. |
| 2012/0308796 A1 | 12/2012 | Tanaka et al. |
| 2013/0261283 A1 | 10/2013 | Motoyoshi et al. |
| 2014/0051300 A1 | 2/2014 | Yamakami |
| 2014/0268333 A1 | 9/2014 | Tanaka et al. |
| 2015/0285954 A1 | 10/2015 | Ishizuka et al. |
| 2016/0319069 A1 | 11/2016 | Shigematsu et al. |
| 2016/0326311 A1 | 11/2016 | Motoyoshi et al. |
| 2019/0241703 A1 | 8/2019 | Kato et al. |
| 2020/0181325 A1 | 6/2020 | Shiratake et al. |
| 2020/0190259 A1 | 6/2020 | Kato et al. |

FOREIGN PATENT DOCUMENTS

| | | |
|---|---|---|
| CN | 1711303 | 12/2005 |
| CN | 101680987 | 3/2010 |
| CN | 102257412 | 11/2011 |
| CN | 102352039 | 2/2012 |
| CN | 102630234 | 8/2012 |

(Continued)

OTHER PUBLICATIONS

International Search Report dated Oct. 19, 2010 in International (PCT) Application No. PCT/JP2010/062481.

(Continued)

*Primary Examiner* — Terressa Boykin
(74) *Attorney, Agent, or Firm* — Wenderoth, Lind & Ponack, L.L.P.

(57) ABSTRACT

The purpose of the present invention is to provide a high temperature/humidity resistant polycarbonate resin without using bisphenol A as a raw material. The present invention relates to a polycarbonate resin comprising the repeating units of formulas (1), (2) and (3), wherein the content of the repeating unit of formula (3) is 5 mol% to 50 mol%, and the refractive index is 1.570 to 1.600. {In formula (1), $R_1$ and $R_2$ each represent a hydrogen atom or a $C_{1-10}$ hydrocarbon group.} {In formula (3), n ranges from 0 to 8, and the R symbols are each selected from $C_{1-3}$ alkyl groups}.

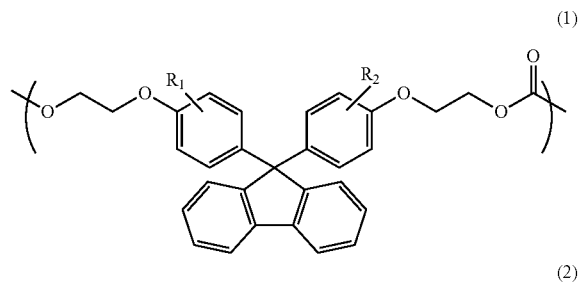

(1)

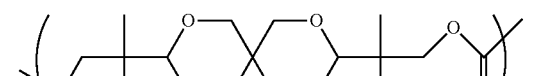

(2)

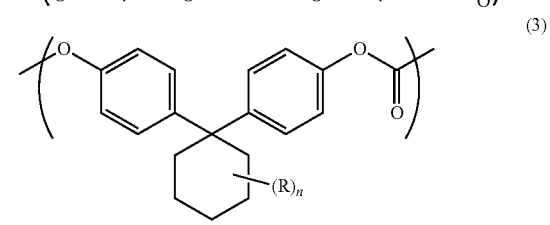

(3)

14 Claims, No Drawings

(56) References Cited

FOREIGN PATENT DOCUMENTS

| | | |
|---|---|---|
| CN | 103201313 | 7/2013 |
| CN | 104263287 | 1/2015 |
| CN | 106029735 | 10/2016 |
| EP | 0 242 465 | 10/1987 |
| EP | 0 787 756 | 8/1997 |
| EP | 1 551 900 | 7/2005 |
| EP | 2 034 337 | 3/2009 |
| EP | 3 677 614 | 7/2020 |
| EP | 3 733 734 | 11/2020 |
| EP | 3 747 856 | 12/2020 |
| JP | 63-63718 | 3/1988 |
| JP | 6-145317 | 5/1994 |
| JP | 6-305044 | 11/1994 |
| JP | 07-198901 | 8/1995 |
| JP | 7-509269 | 10/1995 |
| JP | 8-54615 | 2/1996 |
| JP | 08-311189 | 11/1996 |
| JP | 9-268225 | 10/1997 |
| JP | 10-7782 | 1/1998 |
| JP | 10-87800 | 4/1998 |
| JP | 10-101786 | 4/1998 |
| JP | 10-120777 | 5/1998 |
| JP | 11-269259 | 10/1999 |
| JP | 2000-204150 | 7/2000 |
| JP | 2000-212271 | 8/2000 |
| JP | 2000-219736 | 8/2000 |
| JP | 2000-302857 | 10/2000 |
| JP | 2001-72872 | 3/2001 |
| JP | 2002-284871 | 10/2002 |
| JP | 2002-309015 | 10/2002 |
| JP | 2002-332345 | 11/2002 |
| JP | 2004-67990 | 3/2004 |
| JP | 2005-187661 | 7/2005 |
| JP | 2005-232252 | 9/2005 |
| JP | 2005-241962 | 9/2005 |
| JP | 2007-246629 | 9/2007 |
| JP | 2009-80424 | 4/2009 |
| JP | 2009-249307 | 10/2009 |
| JP | 2010-189562 | 9/2010 |
| JP | 2010-275412 | 12/2010 |
| JP | 2012-155193 | 8/2012 |
| JP | 2012-162590 | 8/2012 |
| JP | 2013-64119 | 4/2013 |
| JP | 2013-76982 | 4/2013 |
| JP | 2014-38772 | 2/2014 |
| JP | 2014-185325 | 10/2014 |
| JP | 2014-205829 | 10/2014 |
| JP | 2015-086265 | 5/2015 |
| JP | 2016-69643 | 5/2016 |
| JP | 2017-082038 | 5/2017 |
| JP | 2017-171885 | 9/2017 |
| JP | 2017-179323 | 10/2017 |
| JP | 2017-207759 | 11/2017 |
| JP | 2018-2893 | 1/2018 |
| JP | 2018-2894 | 1/2018 |
| JP | 2018-059074 | 4/2018 |
| JP | 2018-177887 | 11/2018 |
| KR | 10-1532334 | 6/2015 |
| WO | 94/02533 | 2/1994 |
| WO | 2007/142149 | 12/2007 |
| WO | 2009/058396 | 5/2009 |
| WO | 2011/010741 | 1/2011 |
| WO | 2014/073496 | 5/2014 |
| WO | 2015/170691 | 11/2015 |
| WO | 2017/010318 | 1/2017 |
| WO | 2017/146171 | 8/2017 |
| WO | 2018/008483 | 1/2018 |
| WO | 2018/016516 | 1/2018 |
| WO | 2019/044214 | 3/2019 |
| WO | 2019/044875 | 3/2019 |
| WO | 2019/131841 | 7/2019 |

OTHER PUBLICATIONS

International Preliminary Report on Patentability and Written Opinion dated Feb. 7, 2012 in International (PCT) Application No. PCT/JP2010/062481.
International Search Report dated May 25, 2010 in International (PCT) Application No. PCT/JP2010/053711.
International Search Report dated Mar. 31, 2015 in International (PCT) Application No. PCT/JP2015/056272.
Translation of International Preliminary Report on Patentability and Written Opinion of the International Searching Authority dated Sep. 15, 2016 in International (PCT) Application No. PCT/JP2015/056272.
International Search Report dated Aug. 21, 2018 in International (PCT) Patent Application No. PCT/JP2018/026613, with translation.
International Search Report dated Jun. 11, 2019 in International (PCT) Application No. PCT/JP2019/009776.
Extended European Search Report dated Jan. 3, 2013 in European Application No. 10802361.5.
International Search Report dated May 19, 2020 in International (PCT) Application No. PCT/JP2020/007855.
International Search Report dated May 7, 2019 in International (PCT) Application No. PCT/JP2019/011826.

POLYCARBONATE RESIN AND OPTICAL MEMBER CONTAINING SAME

FIELD

The present invention relates to a polycarbonate and an optical member, and particularly an imaging lens, that comprises it.

BACKGROUND

It is highly desirable to lower the birefringence and to improve the aberration correction power of plastic imaging lenses used in devices such as smartphones. Aberration correction has been achieved in the prior art with such imaging lenses by combining multiple lenses with different optical characteristics (refractive index and Abbe number), or combining different lens shapes.

Among the optical transparent resins employed for lenses, polycarbonate resins produced from bisphenol A starting materials (nd=1.584) have come to be widely used as resins with high refractive indexes and low Abbe numbers. However, because large birefringence is a drawback of polycarbonate resins obtained using bisphenol A starting materials, it has become impossible in recent years to use them in high-resolution cameras.

PTL 1 discloses an imaging lens made of a polycarbonate resin with a small birefringence, which does not use a bisphenol A starting material.

CITATION LIST

Patent Literature

[PTL 1] International Patent Publication No. WO2017/010318

SUMMARY

Technical Problem

It has been found that the imaging lens described in PTL 1, while being highly useful for its small birefringence and absorption percentage, also has issues in terms of humidity resistance at high temperature. It is therefore an object of the present invention to provide a polycarbonate resin that does not use bisphenol A as a starting material and has high humidity resistance at high temperature, as well as an optical member comprising it.

Solution To Problem

The present inventors have found that the problem can be solved by an invention having the following aspects.

<Aspect 1>

A polycarbonate resin comprising a repeating unit of formula (1), formula (2) and formula (3), wherein the content of the repeating unit of formula (3) is 5 mol % to 50 mol % and the refractive index is 1.570 to 1.600:

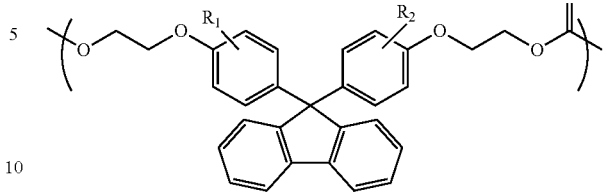

wherein $R_1$ and $R_2$ each represent a hydrogen atom or a hydrocarbon group of 1 to 10 carbon atoms;

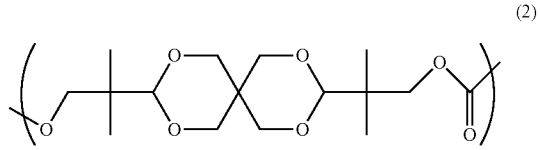

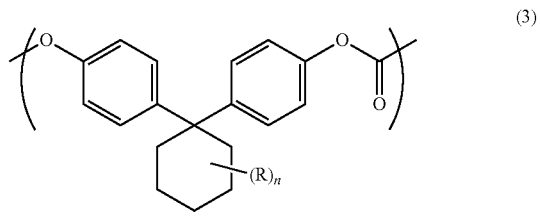

wherein n is in the range of 0 to 8, and each R is selected from among alkyl groups of 1 to 3 carbon atoms.

<Aspect 2>

The polycarbonate resin according to aspect 1, wherein the content of the repeating unit of formula (3) is 10 mol % to 40 mol %.

<Aspect 3>

The polycarbonate resin according to aspect 1 or 2, wherein the content of the repeating unit of formula (1) is 20 mol % to 70 mol %.

<Aspect 4>

The polycarbonate resin according to any one of aspects 1 to 3, wherein the content of the repeating unit of formula (2) is 10 mol % to 60 mol %.

<Aspect 5>

The polycarbonate resin according to aspect 1 or 2, wherein:

$R_1$ and $R_2$ are both hydrogen, the content of the repeating unit of formula (1) is 40 mol % to 65 mol %, and the content of the repeating unit of formula (2) is 10 mol % to 35 mol %.

<Aspect 6>

The polycarbonate resin according to aspect 1 or 2, wherein:

$R_1$ and $R_2$ are both phenyl groups, the content of the repeating unit of formula (1) is 25 mol % to 50 mol %, and the content of the repeating unit of formula (2) is 15 mol % to 60 mol %.

<Aspect 7>

The polycarbonate resin according to any one of aspects 1 to 6, wherein the percentage of terminal phenolic hydroxyl groups is 15% or lower with respect to the total polymer ends.

<Aspect 8>

The polycarbonate resin according to any one of aspects 1 to 7, wherein the repeating unit of formula (3) is introduced from bisphenol TMC.

<Aspect 9>

The polycarbonate resin according to any one of aspects 1 to 8, wherein the Abbe number is 26.0 to 31.0.

<Aspect 10>

The polycarbonate resin according to any one of aspects 1 to 9, wherein the orientation birefringence is $5 \times 10^{-3}$ or smaller.

<Aspect 11>

An optical member comprising the polycarbonate resin according to any one of aspects 1 to 10.

<Aspect 12>

The optical member according to aspect 11, which is a lens.

<Aspect 13>

The optical member according to aspect 11, which is a retardation film.

<Aspect 14>

The optical member according to aspect 12, which is an imaging lens to be used in a cellular phone, smartphone, tablet terminal, personal computer, digital camera, video camera, on-board camera or surveillance camera.

DESCRIPTION OF EMBODIMENTS

<Polycarbonate Resin>

The polycarbonate resin of the invention comprises a fluorene-based unit of formula (1), an oxaspiroundecane-based unit of formula (2) and a cyclohexylidenebisphenol-based unit of formula (3), and the content of the repeating unit of formula (3) is 5 mol % to 50 mol %. The resin of the invention has a refractive index of 1.570 to 1.600.

The imaging lens described in PTL 1 is highly useful because of its small birefringence and absorption percentage, and its heat resistance is also consistent, but the present inventors have found that the imaging lens described in PTL 1 suffers from whitening when exposed to high temperature and high humidity for prolonged periods.

The present inventors have further found that introducing a repeating unit of formula (3) in a given amount into the resin of PTL 1 can substantially prevent whitening of the imaging lens of PTL 1.

It was found that by using a repeating unit of formula (3), the high-temperature humidity resistance is improved over the resin described in PTL 1, essentially without changing the refractive index and Abbe number and without any practical problems in terms of birefringence and absorption percentage, while it is also relatively easier to accomplish shaping into a lens. With a polycarbonate resin intended for optical use, it is extremely difficult to change the monomer composition essentially without changing the refractive index and Abbe number and without any practical problems in terms of birefringence and absorption percentage, while also improving the other properties, and it is therefore unexpected that such properties would be obtained by introduction of a repeating unit of formula (3).

Without being constrained to any particular theory, one reason that these results were obtained by introduction of a repeating unit of formula (3) may be the presence of the two benzene rings and the cyclohexylidene group positioned between them, in the repeating unit of formula (3). Since the carbon of the cyclohexylidene group bonded to the two benzene rings is a quaternary carbon atom, the three cyclic structures do not lie on the same plane. For this reason, presumably, the polycarbonate resin of the invention had smaller birefringence and increased heat resistance due to constrained movement of the main chain of the polymer. A substituent R on the cyclohexylidene group in the repeating unit of formula (3) is particularly preferred since it further constrains movement of the polymer main chain.

<Polymer Structure>

The polycarbonate resin of the invention includes a repeating unit of formula (1). In formula (1), $R_1$ and $R_2$ each represent a hydrogen atom or a hydrocarbon group of 1 to 10 carbon atoms, where the hydrocarbon group may be an alkyl, cycloalkyl or aryl group, and especially a phenyl group. Preferably, $R_1$ and $R_2$ are each a hydrogen atom or a phenyl group.

The polycarbonate resin of the invention may contain the repeating unit of formula (1) at 20 mol % or greater, 25 mol % or greater, 30 mol % or greater, 40 mol % or greater, 45 mol % or greater, 50 mol % or greater, 55 mol % or greater or 60 mol % or greater, and at 70 mol % or less, 65 mol % or less, 60 mol % or less, 55 mol % or less, 50 mol % or less, 45 mol % or less, 40 mol % or less or 35 mol % or less. For example, the resin of the invention may contain the repeating unit of formula (1) at 20 mol % to 70 mol % or 40 mol % to 60 mol %.

When $R_1$ and $R_2$ are both relatively small groups (such as hydrogen atoms), the polycarbonate resin of the invention preferably contains the repeating unit of formula (1) at 40 to 65 mol % or 45 to 55 mol %. When $R_1$ and $R_2$ are both relatively large groups (such as phenyl groups), the polycarbonate resin of the invention preferably contains the repeating unit of formula (1) at 25 to 50 mol % or 30 to 40 mol %.

The polycarbonate resin of the invention may contain the repeating unit of formula (2) at 10 mol % or greater, 15 mol % or greater, 20 mol % or greater, 25 mol % or greater, 30 mol % or greater, 35 mol % or greater, 40 mol % or greater or 45 mol % or greater, and at 60 mol % or less, 55 mol % or less, 50 mol % or less, 45 mol % or less, 40 mol % or less, 35 mol % or less, 30 mol % or less, 25 mol % or less or 20 mol % or less. For example, the resin of the invention may contain the repeating unit of formula (2) at 10 mol % to 60 mol % or 10 mol % to 35 mol %.

When it contains a repeating unit of formula (1) wherein $R_1$ and $R_2$ are both relatively small groups (such as hydrogen atoms), the polycarbonate resin of the invention preferably contains the repeating unit of formula (2) at 10 to 35 mol % or 20 to 30 mol %. When it contains a repeating unit of formula (1) wherein $R_1$ and $R_2$ are both relatively large groups (such as phenyl groups), the polycarbonate resin of the invention preferably contains the repeating unit of formula (2) at 15 to 60 mol %, 20 to 50 mol % or 30 to 45 mol %.

The polycarbonate resin of the invention may contain the repeating unit of formula (3) at 5 mol % or greater, 10 mol % or greater, 15 mol % or greater, 20 mol % or greater, 25 mol % or greater or 30 mol % or greater, and at 60 mol % or less, 55 mol % or less, 50 mol % or less, 40 mol % or less, 35 mol % or less, 30 mol % or less, 25 mol % or less, 20 mol % or less or 15 mol % or less. The polycarbonate resin of the invention preferably contains the repeating unit of formula (3) at 10 to 40 mol % or 15 to 25 mol %.

When it contains a repeating unit of formula (1) wherein $R_1$ and $R_2$ are both relatively small groups (such as hydrogen atoms), the polycarbonate resin of the invention preferably contains the repeating unit of formula (3) at 5 to 50 mol % or 15 to 35 mol %. When it contains a repeating unit of formula (1) wherein $R_1$ and $R_2$ are both relatively large groups (such as phenyl groups), the polycarbonate resin of the invention preferably contains the repeating unit of formula (3) at 15 to 55 mol %, 20 to 50 mol % or 25 to 40 mol %.

The letter n in formula (3) is in the range of 0 to 8, preferably 0 to 5 or 1 to 3, and especially 3. Each R is selected from among alkyl groups of 1 to 3 carbon atoms, and is preferably a methyl or ethyl group, and especially a methyl group. The repeating unit of formula (3) is most preferably 4,4'-(3,3,5-trimethylcyclohexylidene)bisphenol (bisphenol TMC), 4,4'-cyclohexylidenebisphenol bisphenol Z) or 4,4'-(3-methylcyclohexylidene)bisphenol (bisphenol 3MZ), with bisphenol TMC being more preferred.

The polycarbonate resin of the invention may also include a repeating unit other than the repeating units of formula (1), formula (2) and formula (3), in a range such that the advantageous effect of the invention is still obtained. Dihydroxy compounds that provide such repeating units include ethylene glycol, propanediol, butanediol, pentanediol, hexanediol, heptanediol, octanediol, nonanediol, tricyclo [5.2.1.0$^{2,6}$]decanedimethanol, cyclohexane-1,4-dimethanol, decalin-2,6-dimethanol, norbornanedimethanol, pentacyclopentadecanedimethanol, cyclopentane-1,3-dimethanol, isosorbide, isomannide, isoidide, hydroquinone, resorcinol, 2,2-bis(4-hydroxyphenyl)propane, 2,2-bis(3-methyl-4-hydroxyphenyl)propane, 1,1-bis(4-hydroxyphenyl)-1-phenylethane, bis(4-hydroxyphenyl)diphenylmethane, 1,3-bis(2-(4-hydroxyphenyl)-2-propyl)benzene, bis(4-hydroxyphenyl)sulfone, bis(4-hydroxyphenyl)sulfide, biphenol, bisphenolfluorene and biscresolfluorene. Such a repeating unit may be present at 10 mol % or less of the total repeating units.

The polycarbonate resin of the invention preferably has no phenolic hydroxyl groups at the polymer ends. If a monomer that provides the repeating unit of formula (3) is polymerized and bonds to the polymer ends, the terminal groups will be phenolic hydroxyl groups. It is therefore preferable to use a carbonic acid diester, for example, in excess of the dihydroxy compound starting material during polymerization, to add phenyl groups at the ends, thereby reducing the amount of terminal phenolic hydroxyl groups in the polymer.

Percentage of Terminal Phenolic Hydroxyl Groups

This can be calculated by:

Terminal phenolic hydroxyl group percentage=
(Amount of terminal phenolic hydroxyl groups)/
total amount of polymer ends)×100.

The total polymer ends consist of terminal phenolic hydroxyl groups, terminal alcoholic hydroxyl groups and terminal phenyl groups.

There is no limitation to this example, but the percentage of terminal phenolic hydroxyl groups can be determined by the following method.

(1) The terminal phenolic hydroxyl groups are observed by $^1$H NMR measurement of the polymer, and the peak integral is recorded and defined as 1. As the same time, the integrated intensity (A) per proton is calculated from the integrated intensity of the peaks for the 4- and 5-positions of the fluorene structure derived from formula (1).

When no peak is observed for terminal phenolic hydroxyl groups, the percentage of terminal phenolic hydroxyl groups is of course zero.

(2) The mean polymerization degree of the polymer is determined from the number-average molecular weight obtained by GPC measurement of the polymer and the molecular weight and molar ratio of each repeating unit, and the integrated intensity (B) of the polymer ends in the $^1$H NMR spectrum is determined from the mol % of formula (1) and the integrated intensity (A), using the following formula.

$$(B)=(A)\times 100\times 2/([\text{mol \% of formula (1)}]\times \text{mean polymerization degree})$$

(3) The percentage of terminal phenolic hydroxyl groups is calculated as 1/(B)×100.

The percentage of terminal phenolic hydroxyl groups with respect to the total polymer ends of the polycarbonate resin of the invention is preferably 30% or lower, 20% or lower, 15% or lower, 10% or lower, 5% or lower, 3% or lower, 1% or lower or 0.5% or lower.

The carbonic acid diester used to seal the terminal phenolic hydroxyl groups may be a carbonic acid diester that is an optionally substituted aryl or aralkyl group of 6 to 12 carbon atoms. Specific examples include diphenyl carbonate, ditolyl carbonate, bis(chlorophenyl) carbonate and bis (m-cresyl) carbonate. Diphenyl carbonate is most preferred among these. The amount of carbonic acid diester used is preferably 0.95 to 1.10 mol and more preferably 0.98 to 1.04 mol with respect to 1 mol as the total of the dihydroxy compound that provides the repeating units of formula (1) to formula (3).

<Polymer Properties>

The properties of the polycarbonate resin of the invention may be the same as those of the polycarbonate resin described in PTL 1, except for the physical properties relating to high-temperature humidity resistance.

The refractive index of the polycarbonate resin of the invention must therefore be 1.570 or greater at a temperature of 25° C. and a wavelength of 589 nm, or it must be 1.575 or greater, 1.580, 1.585 or greater or 1.590 or greater, and also 1.600 or lower, although the range may be 1.595 or lower or 1.590 or lower.

The Abbe number of the polycarbonate resin of the invention may be 26.0 or greater, 26.5 or greater, 27.0 or greater, 27.5 or greater or 28.0 or greater, and 30.0 or lower, 29.0 or lower, 28.5 or lower, 28.0 or lower or 27.5 or lower.

The Abbe number referred to here is the value calculated using the following formula:

$$vd=(nd-1)/(nF-nC)$$

from the refractive index at a temperature of 25° C. and wavelengths of 486.13 nm, 587.56 nm and 656.27 nm, where:

nd: refractive index at 587.56 nm wavelength,
nF: refractive index at 486.13 nm wavelength,
nC: refractive index at 656.27 nm wavelength.

The relative viscosity of the polycarbonate resin of the invention is preferably in the range of 0.12 to 0.32, and more preferably in the range of 0.18 to 0.30. A relative viscosity of 0.12 to 0.32 results in an excellent balance between moldability and strength.

The method of measuring the relative viscosity may be measurement of the relative viscosity ($\eta_{SP}$) of a solution of 0.7 g of polycarbonate resin dissolved in 100 ml of methylene chloride at 20° C., using an Ostwald viscometer, using the following formula for calculation.

$$\text{Relative viscosity } (\eta_{SP})=(t-t_0)/t_0$$

[$t_0$ is the falling seconds for methylene chloride, and t is the falling seconds for the sample solution]

The absolute value of the orientation birefringence (Δn) of the polycarbonate resin of the invention is preferably 5.0× $10^{-3}$ or smaller, 4.0×$10^{-3}$ or smaller or 2.0×$10^{-3}$ or smaller.

The orientation birefringence (Δn) is determined by stretching a cast film with a thickness of 100 μm obtained from the polycarbonate resin, to a factor of 2 at Tg+10° C., and then measuring at a wavelength of 589 nm.

The polycarbonate resin of the invention has a total light transmittance at 1 mm thickness of preferably 80% or greater, more preferably 85% or greater and even more preferably 88% or greater.

The polycarbonate resin of the invention has an absorption percentage of preferably 0.20% or lower and more preferably 0.18% or lower after immersion for 24 hours at 23° C.

The glass transition temperature of the polycarbonate resin of the invention may be 120° C. or higher, 125° C. or higher, 130° C. or higher, 135° C. or higher, 140° C. or higher, 145° C. or higher or 150° C. or higher, and 160° C. or lower, 155° C. or lower, 150° C. or lower, 145° C. or lower, 140° C. or lower or 135° C. or lower.

The moist heat 2000 hΔb of the polycarbonate resin of the invention is preferably 10 or lower, more preferably 5 or lower and even more preferably 3 or lower.

The Δb value of the polycarbonate resin of the invention before and after PCT treatment is preferably 3 or lower, more preferably 2 or lower and even more preferably 1 or lower.

<Production Method>

The polycarbonate resin of the invention is produced by commonly known reaction means for producing polycarbonate resins, such as a method of reacting a carbonate precursor such as a carbonic acid diester with a dihydroxy compound. The production method may be carried out with reference to PTL 1, except for using a monomer that provides a repeating unit of formula (3).

<Optical Member>

The optical member of the invention includes the polycarbonate resin mentioned above. Such optical members are not particularly restricted so long as they are for optical purposes in which the polycarbonate resin is useful, and they include optical disks, transparent conductive panels, optical cards, sheets, films, optical fibers, lenses, prisms, optical films, base plates, optical filters and hard coat films.

The optical member of the invention may also be constructed of a resin composition comprising the polycarbonate resin, such a resin composition also optionally containing as necessary, additives such as a heat stabilizer, plasticizer, light stabilizer, polymerized metal deactivator, flame retardant, lubricant, antistatic agent, surfactant, antimicrobial agent, ultraviolet absorber or release agent.

<Imaging Lens>

An imaging lens may be specifically mentioned as an optical member for the invention. Imaging lenses include imaging lenses to be used in a cellular phone, smartphone, tablet terminal, personal computer, digital camera, video camera, on-board camera or surveillance camera. The method of shaping the imaging lens may be carried out with reference to PTL 1.

The present invention will now be explained in further detail through the following examples, with the understanding that these examples are not limitative on the invention.

EXAMPLES

Production Examples

Example 1

A mixture of 103.49 g (0.24 mol) of 9,9-bis[4-(2-hydroxyethoxy)phenyl]fluorene (hereunder, "BPEF": monomer introducing repeating unit of formula (1) where $R_1$ and $R_2$ are both hydrogen), 37.80 g (0.12 mol) of 3,9-bis(2-hydroxy-1,1-dimethylethyl)-2,4,8,10-tetraoxaspiro(5.5)undecane (hereunder, "SPG"), 12.42 g (0.04 mol) of 4,4'-(3,3,5-trimethylcyclohexylidene)bisphenol (hereunder, "BisTMC"), 89.11 g (0.42 mol) of diphenyl carbonate and 0.033 ml of a sodium hydrogencarbonate aqueous solution at a 60 mmol/L concentration (2.0 μmol sodium hydrogencarbonate) as a catalyst, was heated and melted at 180° C. under a nitrogen atmosphere. The pressure reduction was subsequently adjusted to 20 kPa over a period of 10 minutes. The temperature was increased to 250° C. at a rate of 60° C./hr, and after the phenol outflow reached 70%, the internal pressure of the reactor was set to ≤133 Pa over a period of 1 hour. Reaction was conducted while stirring for a total of 3.5 hours, and upon completion of the reaction the resin was removed from the flask. The compositional ratio of the obtained polycarbonate resin was measured by NMR. The percentage of terminal phenolic hydroxyl groups was calculated from the number-average molecular weight of the polycarbonate resin and the NMR measurement results.

BPEF was used to introduce a repeating unit of formula (1) wherein $R_1$ and $R_2$ are both hydrogen, and SPG was used to introduce a repeating unit of formula (2). BisTMC has the following chemical structure:

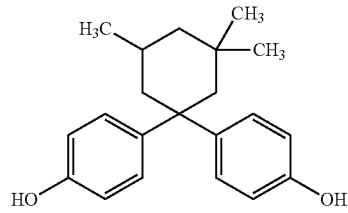

Examples 2 to 6

Polycarbonate resins were produced in the same manner as Example 1, except for changing the BPEF, SPG, BisTMC and diphenyl carbonate to the amounts listed in Table 1.

Example 7

A polycarbonate resin was produced in the same manner as Example 1, except for using 4,4'-cyclohexylidenebisphenol (hereunder, "BisZ") instead of BisTMC, and changing the amounts of each of the monomers to the amounts listed in Table 1.

BisZ has the following chemical structure:

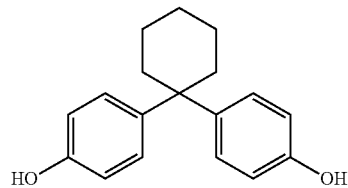 [SMILES: Oc1ccc(C2(c3ccc(O)cc3)CCCCC2)cc1]

Example 8

A polycarbonate resin was produced in the same manner as Example 1, except for using 4,4'-(3-methylcyclohexylidene)bisphenol (hereunder, "Bis3MZ") instead of BisTMC, and changing the amounts of each of the monomers to the amounts listed in Table 1.

Bis3MZ has the following chemical structure:

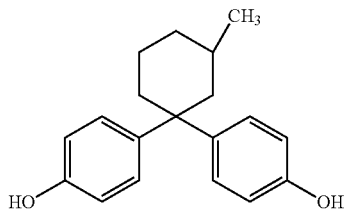 [SMILES: CC1CCCC(c2ccc(O)cc2)(c2ccc(O)cc2)C1]

Examples 9 to 15

Polycarbonate resins were produced in the same manner as Example 1, except for using 9,9-bis(4-(2-hydroxyethoxy)-3-phenylphenyl)fluorene (hereunder, "OPBPEF") instead of BPEF, and changing the amounts of each of the monomers to the amounts listed in Table 1. OPBPEF was used to introduce a repeating unit of formula (1) where $R_1$ and $R_2$ are both phenyl groups.

Comparative Example 1

A polycarbonate resin was produced in the same manner as Example 1, except that BisTMC was not used. and the amounts of each of the monomers were changed to the amounts listed in Table 1. Comparative Example 1 corresponds to the resin disclosed in PTL 1.

Comparative Example 2

A polycarbonate resin was produced in the same manner as Example 1, except for using bisphenol A (BPA) instead of BisTMC, and changing the amounts of each of the monomers to the amounts listed in Table 1.

Comparative Example 3

A polycarbonate resin was produced in the same manner as Example 1, except for using 4,4'-(α-methylbenzylidene)bisphenol (hereunder, "BisM") instead of BisTMC, and changing the amounts of each of the monomers to the amounts listed in Table 1.

BisM has the following chemical structure:

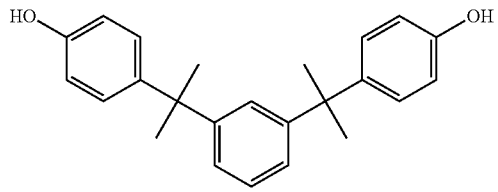 [SMILES: CC(C)(c1ccc(O)cc1)c1cccc(C(C)(C)c2ccc(O)cc2)c1]

<Evaluation Methods>
<Polymer Composition and Percentage of Terminal Phenolic Hydroxyl Groups>

The compositional ratio of each polymer was calculated by $^1$H NMR measurement using a JNM-ECZ400S by JEOL Corp. The percentage of terminal phenolic hydroxyl groups (%) in each polymer was quantified using the number-average molecular weight obtained by GPC measurement, and the spectral data.

The percentage of terminal phenolic hydroxyl groups can be calculated as: (amount of terminal phenolic hydroxyl groups/total amount of polymer ends)×100, and specifically, the following procedure was carried out.

(1) The terminal phenolic hydroxyl groups were directly observed by $^1$H NMR measurement of the polymer, and the peak integral was recorded and defined as 1. As the same time, the integrated intensity (A) per proton was calculated from the integrated intensity of the peaks for the 4- and 5-positions of the fluorene structure derived from formula (1).

When no peak was observed for terminal phenolic hydroxyl groups, the percentage of terminal phenolic hydroxyl groups was defined as zero.

(2) The mean polymerization degree of the polymer was determined from the number-average molecular weight obtained by GPC measurement of the polymer and the molecular weight and molar ratio of each repeating unit, and the integrated intensity (B) of the polymer ends in the $^1$H NMR spectrum was determined from the mol % of formula (1) and the integrated intensity (A), using the following formula.

$$(B)=(A)\times100\times2/([\text{mol \% of formula (1)}]\times\text{mean polymerization degree})$$

(3) The percentage of terminal phenolic hydroxyl groups was calculated as $1/(B)\times100$.

<Glass Transition Temperature>

Using a DSC-60A Thermal Analysis System by Shimadzu Corp., the glass transition temperature (Tg) of each polymer was measured according to JIS K7121, under a nitrogen atmosphere (nitrogen flow rate: 40 ml/min) and with a temperature-elevating rate of 20° C./min.

<Optical Characteristics>
(Refractive Index)

After fabricating and polishing a 3 mm-thick test piece of each polymer, a KPR-2000 Kalnew Precision Refractometer by Shimadzu Corp. was used to measure the refractive index nd (587.56 nm).

(Abbe Number)

The Abbe number was calculated in the same manner.

The measuring wavelength for the Abbe number was calculated using the following formula, from the refractive indexes at 486.13 nm. 587.56 nm and 656.27 nm.

$$vd=(nd-1)/(nF-nC)$$

nd: refractive index at 587.56 nm wavelength,
nF: refractive index at 486.13 nm wavelength,
nC: refractive index at 656.27 nm wavelength.

(Absolute Value of Orientation Birefringence)

After dissolving the polycarbonate resin in methylene chloride, it was cast onto a glass dish and thoroughly dried to fabricate a cast film with a thickness of 100 μm. The absolute value of orientation birefringence (|Δn|) was determined by the following formula, after stretching the film to a factor of 2× at Tg+10° C. and measuring the retardation (Re) at 589 nm using an M-220 ellipsometer by JASCO Corp.

$$|\Delta n|=|Re/d|$$

Δn: Orientation Birefringence
Re: Retardation (nm)
d: Thickness (nm)

<Moist Heat 2000 hΔb>

A 2 mm-thick molded sheet was fabricated for each polymer, and an SH-241 miniature environmental tester by Espec Corp. was used as a moist heat treater for moist heat treatment under conditions with a temperature of 85° C., a relative humidity of 85% and a processing time of 2000 hours. Next 1 g of sample was dissolved in 5 mL of dichloromethane, and the change in L*a*b* value color tone was measured with a Model U-3310 spectrophotometer by Hitachi, Ltd., to obtain Δb for the sample solution before and after the test.

<High-Temperature Humidity Resistance: PCT>
(Δb Value Before and After PCT Treatment)

A 2 mm-thick molded sheet was fabricated for each polymer, and an SN-510 steam sterilizer by Yamato Scientific Co., Ltd. was used for steam treatment for 11 hours under conditions of 120° C., 2 atmospheres ("Pressure Cooker Test", hereunder abbreviated as "PCT").

The polymer before and after PCT treatment was dissolved in dichloromethane at a concentration of 1 g/5 mL, and the change in L*a*b* value color tone was measured with a Model U-3310 spectrophotometer by Hitachi, Ltd., to obtain Δb for the sample solution before and after the PCT treatment.

The presence or absence of whitening or deformation of the molded sheet before and after PCT treatment was visually evaluated. The evaluation was made on the following scale.

(Whitening of Molded Piece After PCT Treatment)
G: Transparent, with absolutely no opaque portions.
F: Some opaque portions observed.
P: Opaque overall.
(Deformation of Molded Piece After PCT Treatment)
G: Absolutely no deformation.
F: Original shape essentially maintained but with some deformation.
P: Original shape not maintained.

<Evaluation of Optical Distortion of Lens>

Using a SE30DU injection molding machine by Sumitomo Heavy Industries, Ltd. with a cylinder temperature of 280° C. and a die temperature of 120° C., a Φ5 mm aspherical lens was injection molded to a thickness of 0.2 mm, a convex curvature radius of 5 mm and a concave curvature radius of 4 mm. Optical distortion was evaluated by observing light leakage by the cross-Nicol method, with the aspherical lens gripped between two polarizing plates. The evaluation was made on the following scale.
VG: Virtually no light leakage.
G: Slight light leakage observed.
F: Light leakage observed.
P: Considerable light leakage.

<Results>

The constructions and evaluation results for the Examples and Comparative Examples are summarized in Table 1 and Table 2.

TABLE 1

|  | Example | | | | | | | | Comparative Example | | | |
| --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 |
| BPEF | 59 | 55 | 55 | 50 | 50 | 45 | 45 | 50 | 59 | 50 | 50 | 50 |
| SPG | 31 | 32 | 30 | 25 | 25 | 13 | 17 | 25 | 41 | 25 | 25 | 25 |
| BisTMC | 10 | 13 | 15 | 25 | 25 | 42 | — | — | — | — | — | — |
| BisZ | — | — | — | — | — | — | 38 | — | — | — | — | — |
| Bis3 MZ | — | — | — | — | — | — | — | 25 | — | — | — | — |
| BPA | — | — | — | — | — | — | — | — | — | 25 | — | — |
| BisM | — | — | — | — | — | — | — | — | — | — | 25 | 25 |
| DPC molar ratio with respect to total monomer | 1.04 | 1.04 | 1.04 | 0.98 | 1.04 | 1.04 | 1.04 | 1.04 | 1.04 | 1.04 | 1.04 | 0.98 |
| Percentage of terminal phenolic hydroxyl groups [%] | 0 | 0 | 0 | 34 | 0 | 0 | 0 | 0 | 0 | 0 | 0 | 18 |
| Tg [° C.] | 134 | 135 | 137 | 146 | 143 | 162 | 135 | 136 | 129 | 128 | 117 | 120 |
| Refractive Index | 1.592 | 1.588 | 1.589 | 1.588 | 1.588 | 1.590 | 1.599 | 1.591 | 1.585 | 1.595 | 1.594 | 1.594 |
| $|\Delta n| \times 10^{-3}$ | 1.4 | 2.1 | 2.2 | 2.3 | 2.3 | 5.0 | 4.0 | 3.7 | 0.6 | 4.2 | 3.8 | 3.8 |
| Abbe number | 27.6 | 28.1 | 28.1 | 28.2 | 28.3 | 26.6 | 26.5 | 27.5 | 28.3 | 26.9 | 27.1 | 27.1 |
| Moist heat 2000 hΔb | 0.8 | 0.9 | 1.1 | 5.2 | 1.8 | 3.0 | 2.7 | 1.9 | 0.4 | 1.9 | 1.7 | 5.3 |
| Δb before and after PCT | 0.3 | 0.6 | 0.5 | 0.8 | 0.6 | 0.8 | 0.8 | 0.8 | 1.1 | 0.7 | 0.6 | 0.8 |
| PCT whitening | F | F | F | G | G | G | F | F | P | P | P | P |
| PCT deformation | F | F | F | G | G | G | F | F | P | P | P | P |
| PCT overall evaluation | F | F | F | G | G | G | F | F | P | P | P | P |
| Lens optical distortion | VG | VG | VG | VG | VG | F | G | G | VG | G | G | G |

Monomer amounts are molar ratios.

TABLE 2

|  | Example | | | | | | |
| --- | --- | --- | --- | --- | --- | --- | --- |
|  | 9 | 10 | 11 | 12 | 13 | 14 | 15 |
| OPBPEF | 40 | 35 | 35 | 35 | 30 | 30 | 30 |
| SPG | 40 | 40 | 35 | 30 | 30 | 25 | 20 |
| BisTMC | 20 | 25 | 30 | 35 | 40 | 45 | 50 |
| DPC molar ratio with respect to total monomer | 1.04 | 1.04 | 1.04 | 1.04 | 1.04 | 1.04 | 1.04 |
| Percentage of terminal phenolic hydroxyl groups [%] | 0 | 0 | 0 | 0 | 0 | 0 | 0 |
| Tg [° C.] | 138 | 141 | 146 | 151 | 154 | 159 | 163 |
| Refractive index | 1.589 | 1.583 | 1.586 | 1.589 | 1.582 | 1.585 | 1.588 |

TABLE 2-continued

| | Example | | | | | | |
|---|---|---|---|---|---|---|---|
| | 9 | 10 | 11 | 12 | 13 | 14 | 15 |
| $\|\Delta n\| \times 10^{-3}$ | 3 | 3.9 | 4.2 | 4.5 | 6.1 | 5.7 | 6.8 |
| Abbe number | 27.5 | 28.2 | 27.9 | 27.6 | 28.4 | 28.1 | 28.9 |
| Moist heat 2000 h$\Delta$b | 1.3 | 1.8 | 2 | 2.3 | 2.5 | 3 | 3.2 |
| PCT whitening | F | G | G | G | G | G | G |
| PCT deformation | F | G | G | G | G | G | G |
| Lens optical distortion | VG | G | G | G | F | F | F |

Monomer amounts are molar ratios.

Examples 1 to 8 had refractive indexes and Abbe numbers equivalent to those of Comparative Example 1, which corresponds to the prior art (PTL 1), while the increase in birefringence was also in the allowable range, and therefore the high-temperature humidity resistance test results were satisfactory.

By comparing Examples 1 to 6 it is seen that gradually increasing the repeating unit of formula (3) (BisTMC) tends to improve the results in the high-temperature humidity resistance test. Satisfactory results are also obtained by a repeating unit of formula (3) other than BisTMC. However, in Comparative Examples 2 and 3 which did not have a repeating unit of formula (3), the results in the high-temperature humidity resistance test were equivalent to Comparative Example 1.

Based on Examples 9 to 15 it is seen that useful polycarbonate resins were obtained not only when using BPEF but also when using OPBPEF as the repeating unit of formula (1). From these results it can be surmised that useful polycarbonate resins are obtainable not only with BPEF and OPBPEF but also with other repeating units of formula (1).

The invention claimed is:

1. A polycarbonate resin comprising a repeating unit of formula (1), formula (2) and formula (3), wherein the content of the repeating unit of formula (3) is greater than 10 mol% and 50 mol% or less and the refractive index is 1.570 to 1.600:

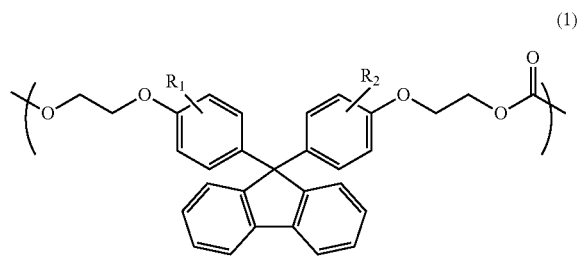

(1)

wherein $R_1$ and $R_2$ each represent a hydrogen atom or a hydrocarbon group of 1 to 10 carbon atoms;

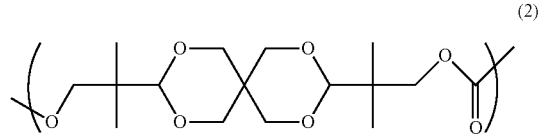

(2)

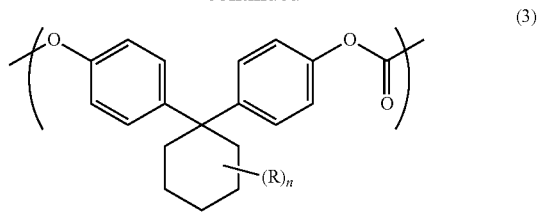

(3)

wherein n is in the range of 0 to 8, and each R is selected from among alkyl groups of 1 to 3 carbon atoms.

2. The polycarbonate resin according to claim 1, wherein the content of the repeating unit of formula (3) is greater than 10 mol% and 40 mol% or less.

3. The polycarbonate resin according to claim 1, wherein the content of the repeating unit of formula (1) is 20 mol% to 70 mol%.

4. The polycarbonate resin according to claim 1, wherein the content of the repeating unit of formula (2) is 10 mol% to 60 mol%.

5. The polycarbonate resin according to claim 1, wherein:
   $R_1$ and $R_2$ are both hydrogen,
   the content of the repeating unit of formula (1) is 40 mol% to 65 mol%, and
   the content of the repeating unit of formula (2) is 10 mol% to 35 mol%.

6. The polycarbonate resin according to claim 1, wherein:
   $R_1$ and $R_2$ are both phenyl groups,
   the content of the repeating unit of formula (1) is 25 mol% to 50 mol%, and
   the content of the repeating unit of formula (2) is 15 mol% to 60 mol%.

7. The polycarbonate resin according to claim 1, wherein the percentage of terminal phenolic hydroxyl groups is 15% or lower with respect to the total polymer ends.

8. The polycarbonate resin according to claim 1, wherein the repeating unit of formula (3) is introduced from bisphenol TMC.

9. The polycarbonate resin according to claim 1, wherein the Abbe number is 26.0 to 31.0.

10. The polycarbonate resin according to claim 1, wherein the orientation birefringence is $5\times10^{-3}$ or smaller.

11. An optical member comprising the polycarbonate resin according to claim 1.

12. The optical member according to claim 11, which is a lens.

13. The optical member according to claim 11, which is a retardation film.

14. The optical member according to claim 12, which is an imaging lens to be used in a cellular phone, smartphone, tablet terminal, personal computer, digital camera, video camera, on-board camera or surveillance camera.

* * * * *